United States Patent
Gayer et al.

(10) Patent No.: US 12,280,705 B2
(45) Date of Patent: Apr. 22, 2025

(54) BEVERAGE HOLDER WITH TEXTILE COMPENSATION ELEMENTS

(71) Applicant: Dr. Ing. h.c. F. Porsche Aktiengesellschaft, Stuttgart (DE)

(72) Inventors: Bernd Gayer, Weissach (DE); Marc-Lieven Heth, Karlsruhe (DE); Michael Alborg, Gerlingen (DE)

( * ) Notice: Subject to any disclaimer, the term of this patent is extended or adjusted under 35 U.S.C. 154(b) by 0 days.

(21) Appl. No.: 18/237,940

(22) Filed: Aug. 25, 2023

(65) Prior Publication Data

US 2024/0067100 A1 Feb. 29, 2024

(30) Foreign Application Priority Data

Aug. 26, 2022 (DE) .................. 10 2022 121 678.0

(51) Int. Cl.
*B60N 3/10* (2006.01)

(52) U.S. Cl.
CPC ............. *B60N 3/108* (2013.01); *B60N 3/106* (2013.01)

(58) Field of Classification Search
CPC ......... B60N 3/108; B60N 3/106; B60R 11/00; B60R 2011/0075
See application file for complete search history.

(56) References Cited

U.S. PATENT DOCUMENTS

| | | | | |
|---|---|---|---|---|
| 2,956,687 A * | 10/1960 | Robichaud | ......... | B65D 81/1075 206/217 |
| 3,090,478 A * | 5/1963 | Stanley | .......... | B65B 43/54 248/128 |
| 5,639,052 A * | 6/1997 | Sauve | .......... | B60N 3/103 248/314 |
| 5,687,874 A * | 11/1997 | Omori | .......... | B65G 17/32 220/737 |
| 5,704,579 A * | 1/1998 | Celentino | .......... | B60N 3/106 248/311.2 |
| 5,746,363 A * | 5/1998 | Teller | .......... | B60N 3/103 224/547 |
| 6,170,787 B1 * | 1/2001 | Morgan | .......... | B60N 3/108 248/311.2 |
| 6,302,364 B1 * | 10/2001 | Chiueh | .......... | B60N 3/10 206/545 |
| 7,090,183 B2 * | 8/2006 | Heybl | .......... | A47G 23/0225 248/230.8 |

(Continued)

FOREIGN PATENT DOCUMENTS

| | | | | |
|---|---|---|---|---|
| DE | 19533304 A1 * | 3/1997 | ............. | B60N 3/101 |
| DE | 102010061250 A1 * | 6/2012 | ............. | B60N 3/101 |

(Continued)

OTHER PUBLICATIONS

German Search Report May 25, 2023.

*Primary Examiner* — Taylor Morris
(74) *Attorney, Agent, or Firm* — Gerald E. Hespos; Michael J Porco

(57) ABSTRACT

A beverage holder (1) for a motor vehicle has a receptacle (2) with a side wall (5) extending from a bottom wall (3) to an open top (4) that is farther upward. At least one elastic compensation element (7) is provided for holding differently sized drinking vessels (6). The side wall (5) has at least one opening (8), and an elastic covering (10) penetrates the opening (8) due to its biasing to form the elastic compensation element (7).

11 Claims, 5 Drawing Sheets

(56) References Cited

U.S. PATENT DOCUMENTS

| | | | | |
|---|---|---|---|---|
| 7,147,192 | B2 * | 12/2006 | Kong | B60N 3/108 |
| | | | | 248/311.2 |
| 7,165,752 | B2 * | 1/2007 | Dobos | B60N 3/108 |
| | | | | 248/311.2 |
| 8,662,580 | B2 * | 3/2014 | Henke | B60N 3/101 |
| | | | | 297/188.14 |
| 8,733,724 | B2 * | 5/2014 | Voigt | B60N 3/108 |
| | | | | 248/316.1 |
| 9,011,276 | B2 * | 4/2015 | Holland | A63B 69/0075 |
| | | | | 473/420 |
| 9,120,402 | B2 * | 9/2015 | Caruso | B60N 3/108 |
| 9,174,799 | B2 * | 11/2015 | Virgen | B29C 45/0001 |
| 9,216,693 | B2 * | 12/2015 | Poindexter, Jr. | B60N 3/101 |
| 9,694,731 | B2 * | 7/2017 | Hipshier | B29C 44/08 |
| 10,099,595 | B2 * | 10/2018 | Gaudreau, Jr. | B60N 2/79 |
| 10,252,658 | B2 * | 4/2019 | Kong | B60N 3/106 |
| 10,293,733 | B2 * | 5/2019 | Kong | B60N 3/108 |
| 10,479,252 | B2 | 11/2019 | Agresti | |
| 2014/0158852 | A1 * | 6/2014 | Andersson | B60N 2/757 |
| | | | | 248/346.03 |
| 2016/0129814 | A1 * | 5/2016 | Goebbels | B60N 2/753 |
| | | | | 297/188.15 |
| 2024/0017910 | A1 * | 1/2024 | Doran | B65D 81/3876 |

FOREIGN PATENT DOCUMENTS

| | | | | |
|---|---|---|---|---|
| DE | 102016106471 A1 | | 10/2017 | |
| DE | 102016110724 A1 | * | 12/2017 | B60N 3/101 |
| DE | 102016110727 A1 | * | 12/2017 | B60N 3/10 |
| DE | 102023107655 B3 | * | 5/2024 | B60N 3/10 |
| EP | 12623623 | | 12/2002 | |
| FR | 3015385 A1 | * | 6/2015 | B60N 3/106 |
| FR | 3104503 A1 | * | 6/2021 | B60N 3/104 |
| GB | 2583505 A | * | 11/2020 | B60N 3/106 |
| KR | 19980051831 U | * | 10/1998 | B60N 3/108 |
| KR | 20050046945 A | | 5/2005 | |
| KR | 20080017927 A | * | 2/2008 | B60N 3/103 |
| WO | WO-0100439 A1 | * | 1/2001 | B60N 3/101 |

* cited by examiner

BEVERAGE HOLDER WITH TEXTILE COMPENSATION ELEMENTS

CROSS REFERENCE TO RELATED APPLICATION

This application claims priority on German Patent Application No 10 2022 121 678.0 filed Aug. 26, 2022, the entire disclosure of which is incorporated herein by reference.

BACKGROUND

Field of the Invention

The invention relates to a beverage holder for a motor vehicle.

Related Art

Beverage holders are used in motor vehicles to store drinking vessels during a journey. The diameters of the beverage holders are based on the size of commercially available drinking vessels, for example bottles, cans, or glasses, but vary depending on the volume of the drinking vessel. The interior of beverage holders have mechanical or, less commonly, textile compensation elements for secure fixing of the drinking vessel. The receiving region typically is cylindrical and is configured as a single or double cupholder. The compensation elements often have many parts and require complex mounting. Compensation elements often contact spaced surface areas on the drinking vessel, resulting in an uneven force distribution.

A cupholder for a motor vehicle with an elastic insert is shown in U.S. Pat. No. 10,479,252 B2.

EP 1 262 363 B1 describes a beverage holder in a vehicles that adjusts for drinking vessels having different outer diameters. A compensation element is formed from a textile material.

An object of the invention is to provide a beverage holder with a textile compensation element.

SUMMARY

A beverage holder for a motor vehicle in accordance with an embodiment of the invention comprises a receptacle having a side wall extending from a bottom wall to an open top. The bottom wall is configured as a staging area, and the top is farther above and is open. The beverage holder comprises at least one elastic compensation element for holding differently sized drinking vessels. The side wall comprises at least one opening. An elastic covering penetrates the opening due to its inherent biasing and thereby forms the elastic compensation element. The beverage holder of some embodiments is arranged in the center console of the vehicle or on the doors. The side wall of the receptacle is configured to receive drinking vessels of different sizes and shapes. Holding of further objects, for example cell phones or eyewear cases, is possible and is implied below without further mention. The drinking vessel is placed on the bottom wall via the open top into a receiving region. An inlay can be arranged above the bottom wall to cover, for example, underlying points of attachment. The drinking vessel of some embodiments is a bottle, a can, or a glass. The elastic compensation element engages the drinking vessel to avoid slipping of the drinking vessel during travel. In addition, the beverage holder can hold drinking vessels in which the shape deviates from the typical circular shape. The beverage holder comprises at least one elastic compensation element that can adapt to the shape of the drinking vessel. The elastic covering has a smaller inner diameter than the outer diameter of the side wall of the receptacle. Due to its elastic properties, the elastic covering can be pulled over the outer area of the side wall. The elastic covering may be formed from an elastomeric plastic. The biasing of the elastic covering causes the elastic covering to penetrate through the opening and thus forms an elastic compensation element.

In some embodiments, the elastic covering is connected to the receptacle at a first region and a second region and/or a third region. An extensive assembly of the typically mechanical compensation element and attachment of the compensation element to the receptacle is omitted. The elastic covering has homogeneous component properties. Thus, no complex manufacturing methods need be applied in the manufacture to accommodate partial change of the component properties.

The beverage holder can comprise at least three elastic compensation elements. The weight of the first receiving region can be reduced further by additional recesses. The contact surfaces ensure a homogeneous distribution of force on rounded drinking vessels. The retaining force applied to the drinking vessel is adjustable via the selection and design of the material. The outer surfaces of the elastic compensation elements that are visible to the user are designed to be manageable in terms of texture and coloration. The elastic covering avoids disruptive sounds, such as rattling, for drinking vessels with a drinking vessel diameter that is slightly smaller than the second diameter.

The beverage holder of some embodiments has elliptical recesses that are configured to be greater in their radial extension than in the axial direction. The ratio of recess width to recess height enables the compensation elements to be arranged higher in the receiving region of the receptacle. Thus, the radially abutting surface on the drinking vessel is increased, and the point of contact of the compensation elements can be higher in the receptacle to ensure a secure retention.

The receptacle of the beverage holder may be formed integrally. The integral configuration of the receptacle eliminates potential points of connection, thereby reducing weight and avoiding potential weaknesses.

The bottom wall of the receptacle of the beverage holder may have a circular, rectangular or trapezoidal cross-section, for example. The bottom wall of the receptacle is decisive for the shape of the beverage holder and can be designed according to the desired application. For accommodating drinking vessels, the first surface can be configured corresponding to the base surface thereof. Insofar as the receptacle serves for storage of tablets or cell phones, the bottom wall can be designed with a rectangular cross-section.

According to an advantageous embodiment of the invention, the receptacle and/or the elastic covering have a conical shape. When selecting manufacturing methods, manufacturing specifications must be observed. The receptacle preferably is produced by injection molding. For a better demolding of the first receiving region from the injection molding tool, it can have a conical shape. In order to ensure an even biasing of the elastic covering in a conical shape, the elastic covering should also have a conicity.

The receptacle and the elastic covering can be connected by staking and/or a positive-locking connection and/or a cable tie in a first region, a second region and/or a third region. The elastic covering preferably is fixed at two sections, requiring at least one connection in the first region.

Connections achieved by staking have the advantage that no additional connecting elements are necessary, and staking can be automated easily.

The elastic covering of some embodiments is formed from a textile fabric. Textile fabrics can be formed from different materials and produced by a variety of methods, so that the properties of the elastic covering are easily adjustable. Unlike an elastomeric plastic, textile fabrics have more appealing haptic and mechanical properties. Textile fabrics are joined easily to create the elastic covering in a simple manner. The connection may be formed by sewing. The textile fabric can be configured to permit elongation in the radial direction.

The invention also relates to a method for assembling the elastic covering of the beverage holder. The method of some embodiments includes drawing the elastic covering onto a tube that is variable in diameter. The method then includes fixing the elastic covering in the first region of the receptacle. The method then may include unrolling the elastic covering from the tube and pushing into the openings of the receptacle. Finally, the method includes fixing the elastic covering in a second and/or third region of the receptacle.

The beverage holder can be configured to accommodate a plurality of drinking vessels. The beverage holders can be arranged independently of one another or in a design as double-drink holders that are configured in the form of an open eight in a top plan view. A depression can be arranged between the two beverage holders. The depression allows for the accommodation of drinking vessels with a handle, for example a mug. In the arrangement of further connection points between the receiving regions and the elastic covering, preferably in the region of the depression, the elastic covering can also be integrally formed.

An embodiment of the invention is described below with reference to several figures.

DETAILED DESCRIPTION

Figure 1:
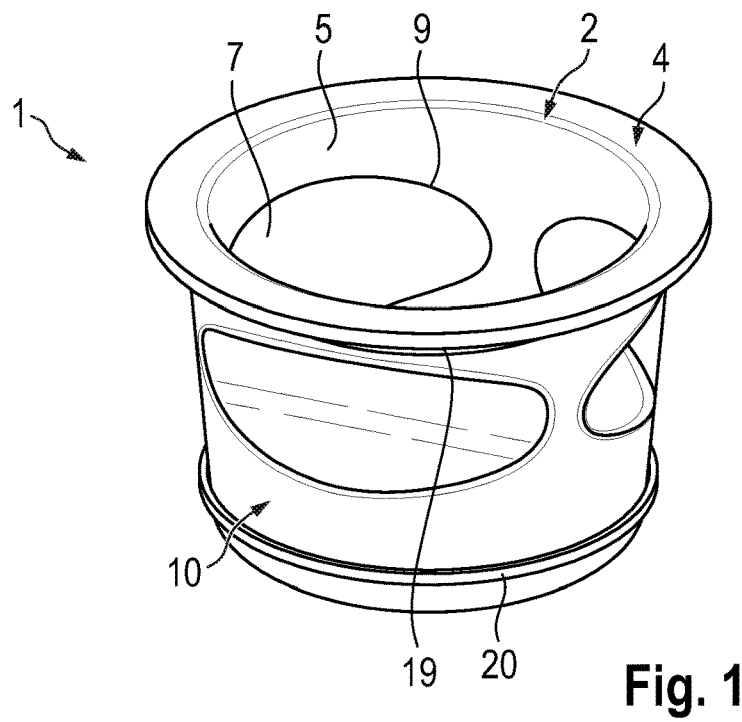
FIG. 1 is a perspective view of a beverage holder according to a first embodiment.
Figure 2:
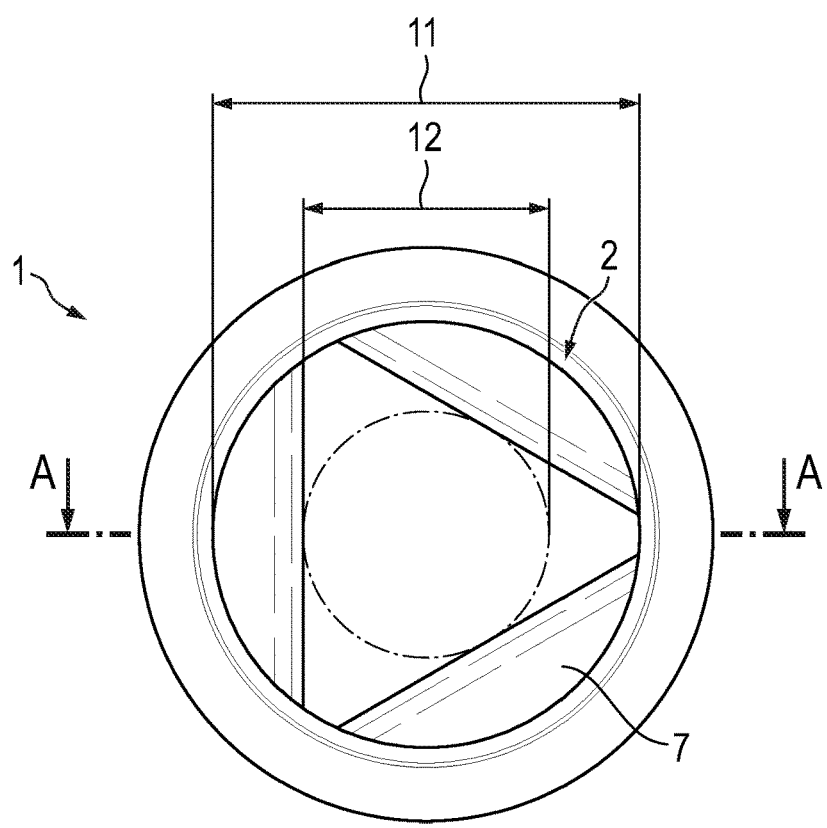
FIG. 2 is a top plan view of the beverage holder from FIG. 1.
Figure 3:
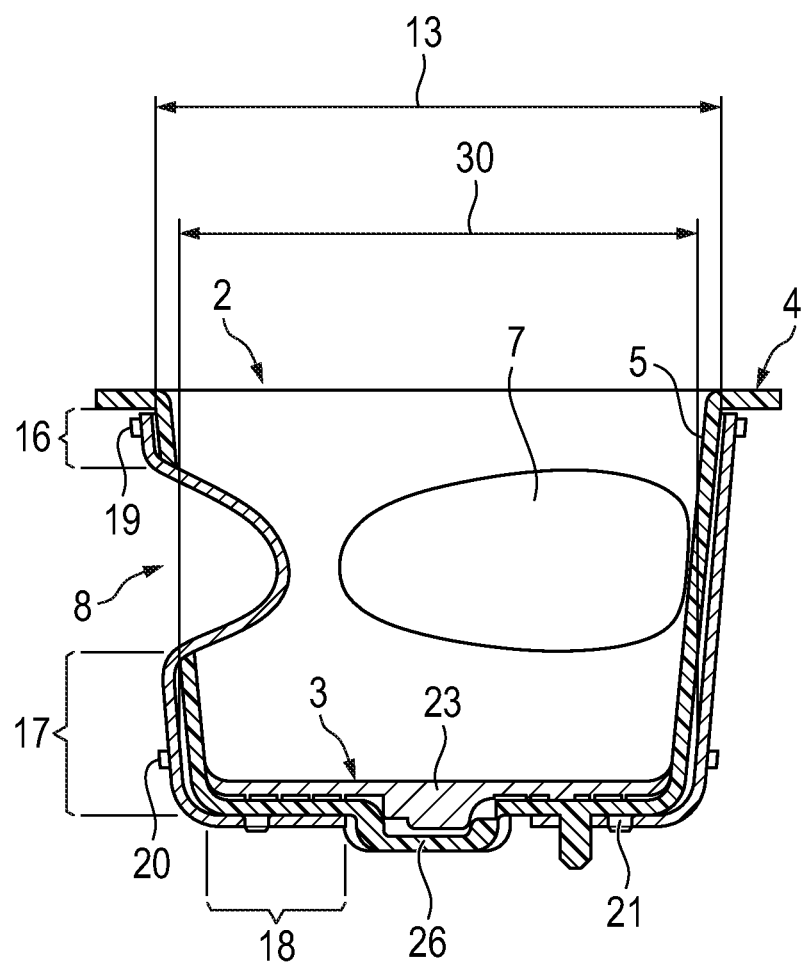
FIG. 3 a cross-sectional view taken along line A-A of FIG. 2.

FIG. 1 to FIG. 3 show a beverage holder 1 having a receptacle 2 configured to receive drinking vessels 6 of various sizes and shapes. The receptacle 2 is an integral component formed from a plastic injection mold and has a conicity that tapers downwards from a wide open top 4 to a narrower closed bottom wall 3. The open top 4 of the receptacle 2 includes an outwardly extending flange. The receptacle 2 also has a side wall 5 that tapers to narrower widths from the open top 4 to the bottom wall 3. The side wall 5 has three elliptical openings 8 each of which is bounded by an edge region 9 that tapers to a smaller size for the respective opening at positions closer to the inner surface of the receptacle 2.

The beverage holder 1 comprises an elastic covering 10 on the outer side of the receptacle 2. The covering 10 has a smaller unbiased inner diameter 30 than the outer diameter 13 of the side wall 5 of the receptacle 2, as shown in FIG. 3. Due to its elastic properties, the elastic covering 10 can be pulled over the outer surface of the side wall 5 of the receptacle 2. The elastic covering 10 is formed from an elastomeric plastic or a textile fabric and is arranged on the outside of the side wall 5 of the receptacle 2. A first connection 19 fixes the elastic covering 10 to a first region 16 of the side wall of the receptacle 2 between the elliptical openings 8 and the top 4 of the receptacle 2, and a second connection 20 fixes the elastic covering 10 to a second region 17 of the side wall 5 of the receptacle 2. Inherent biasing of the elastomeric plastic or a textile fabric causes the elastic covering 10 to penetrate the openings 8. The elastic covering 10 is diverted at the edge 9 of each opening 8 and forms an elastic compensation element 7, as shown in FIG. 3. The elastic compensation element 7 has the form of a cylinder cut-out. The drinking vessel 6 enters the side wall 5 of the receptacle 2 via the open top 4 and is placed on the bottom wall 3.

As shown in the top plan view of FIG. 2, the side wall 5 of the receptacle 2 of the beverage holder 1 has a first inside diameter 11 adjacent the open top 4 and a second inside diameter 12 adjacent the bottom wall 3. The beverage holder can receive a drinking vessel 6 having a diameter that is smaller than the first diameter 11. A tipping of the drinking vessel 6 can be avoided when the drinking vessel diameter 29, at the height 28 of the elastic compensation elements 7, lies between a first diameter 11 and a second diameter 12.

FIG. 3 shows a sectional view of the beverage holder 1 taken along line A-A in FIG. 2. The bottom wall 3 comprises a fastening point 26 for attaching the beverage holder 1 to the center console of a vehicle. An inlay 23 is arranged above the bottom wall 3 of the receptacle 2 to cover this fastening point 26. The first connection 19 connects elastic covering 10 to the first region 16 of the side wall 5 of the receptacle 2, the second connection 20 connects elastic covering 10 to the second region 17 of the side wall 5 of the receptacle 2, and the third connection 21 connects elastic covering 10 to the third region 18 on the bottom wall 3.

Figure 4:
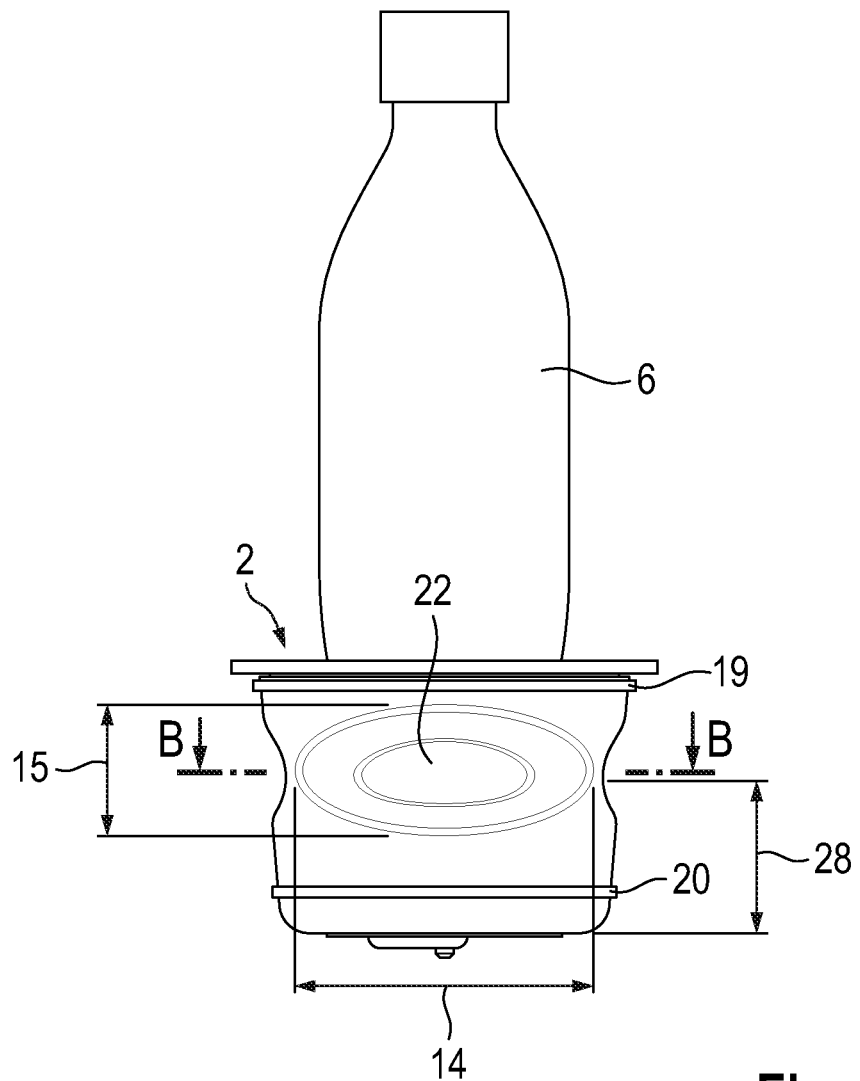
FIG. 4 a side view of the beverage holder of FIG. 1 with a drinking vessel placed therein.

FIG. 4 shows a side view of the beverage holder 1 of FIG. 1 with a drinking vessel 6 placed therein. The drinking vessel 6 is positioned on the bottom wall 3 and has a drinking vessel diameter 29 that is smaller than the first diameter 11 but larger than the second diameter 12. The elastic compensation elements 7 conform to the shape of the drinking vessel 6. The drinking vessel 6 is held securely, and a homogeneous force distribution is present in the region of the adjoining surface 22. The first connection 19 connects the elastic covering 10 to the first region 16 of the first region 16 on the side wall 5 of the receptacle 2, and the second connection 20 connects the elastic covering 10 to the second region 17 on the side wall 5 of the receptacle 2. The opening 8 is oriented radially and has an elliptical shape with a greater width 14 along the circumference of the side wall 5 of the receptacle 2 in relation to the recess height 15.

Figure 5:
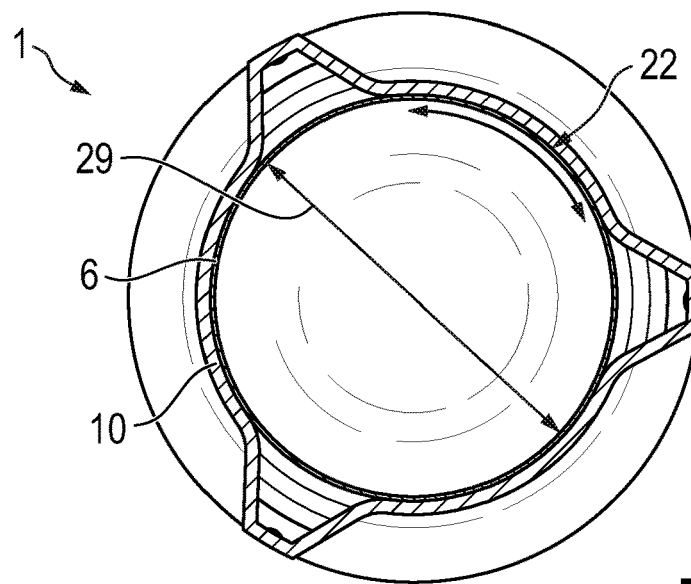
FIG. 5 a cross-sectional view taken along line B-B of FIG. 4.

FIG. 5 is a cross-sectional view of the beverage holder taken along line B-B of FIG. 4 and shows that the elastic compensation elements 7 abut the placed drinking vessel 6.

Figure 6:
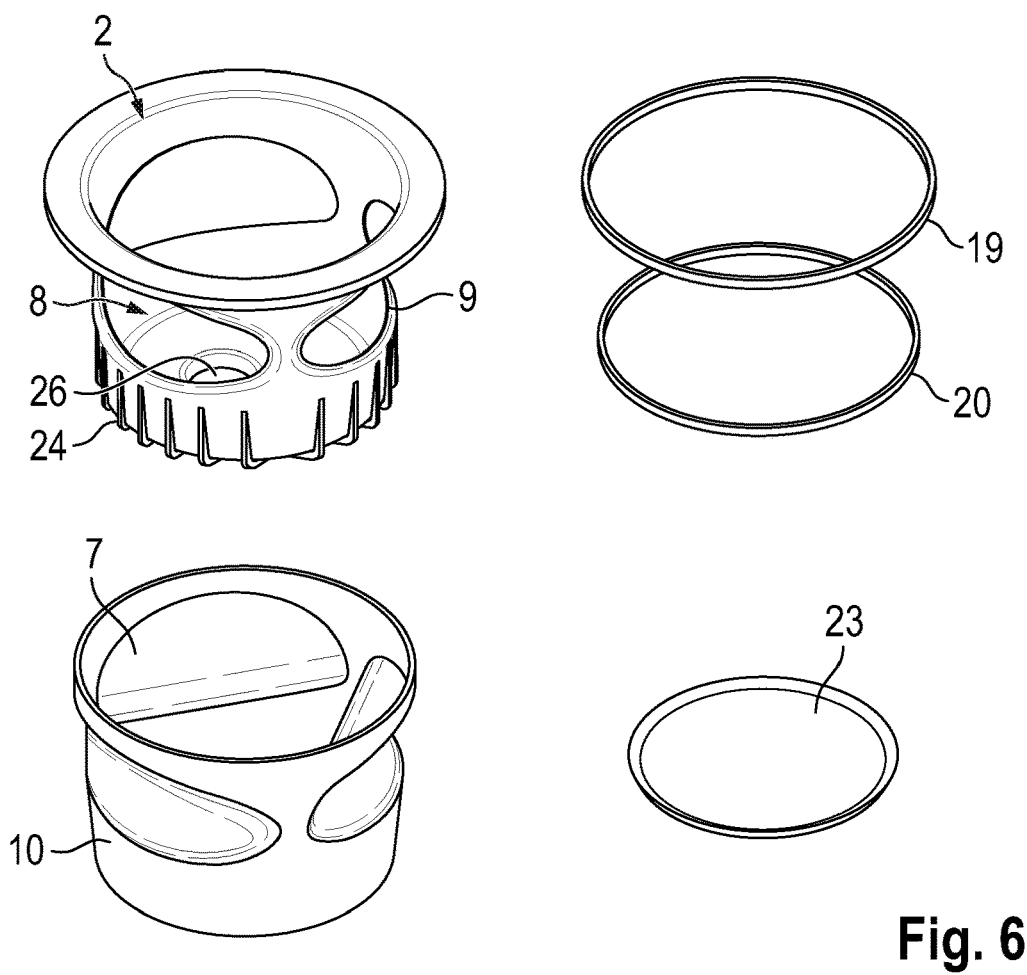
FIG. 6 an exploded perspective view of the beverage of FIG. 1.

FIG. 6 is an exploded perspective view of the beverage holder 1 that includes the receptacle 2, the elastic covering 10, the inlay 23, and the connections 19, 20. The side wall 5 of the receptacle 2 comprises rib structures 24 formed in the second region 17 for stiffening the beverage holder 1. A fastening point 26 in the form of a through-hole is formed in the bottom wall 3 and is covered by the inlay 23. The side wall 5 has three recesses 8 bounded respectively by the edges 9. Each edge region 9 is rounded or tapered so that the elastic covering 10 is not damaged.

Figure 7:
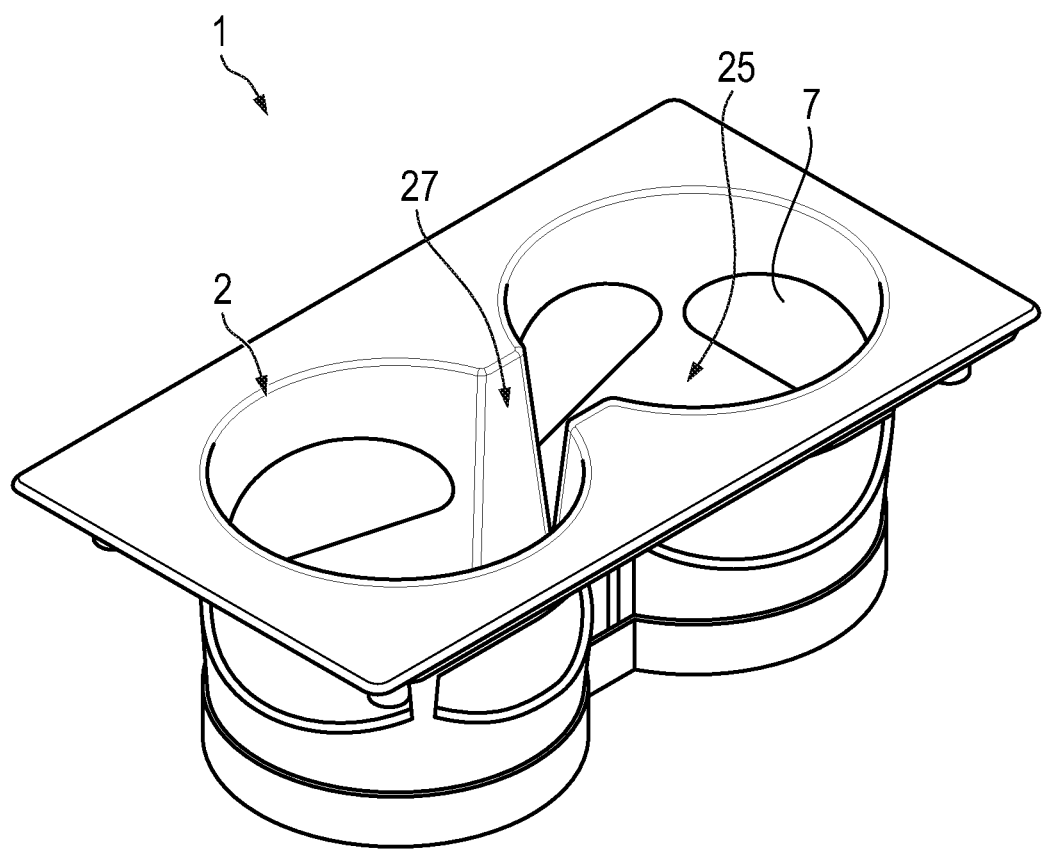
FIG. 7 a perspective view of a beverage holder of a second embodiment.

FIG. 7 is a perspective view of a beverage holder 21 of a second embodiment. The beverage holder 21 is configured as a double beverage holder in the form of a prostrate number eight. In addition to the side wall 5, the beverage holder 21 comprises a second side wall 25. The two side walls 5, 25 are connected to one another and have a depression 27 in the middle.

LIST OF REFERENCE NUMERALS

1 Beverage holder
2 Receptacle
3 Bottom wall
4 Top
5 Side wall
6 Drinking vessel
7 Elastic compensation element
8 Recess
9 Edge region
10 Elastic covering
11 First diameter
12 Second diameter
13 Outer diameter
14 Recess width
15 Recess height
16 First region
17 Second region
18 Third region
19 First connection
20 Second connection
21 Third connection
22 Adjacent surface
23 Inlay
24 Rib structure
25 Second receiving region
26 Fastening point
27 Depression
28 Compensation element height
29 Drinking vessel diameter
30 Inner diameter

The invention claimed is:

1. A beverage holder (1) for a motor vehicle, comprising:
a receptacle (2) having a bottom wall (3), a side wall (5) extending from the bottom wall (3) and an open top (4) arranged upward from the bottom wall (3), plural openings (8) penetrating the side wall (5) at circumferentially spaced positions around the side wall (5); and
an elastic covering (10) surrounding at least parts of the side wall (5) and penetrating the plural openings (8) due to inherent resiliency of the elastic covering (10), parts of the elastic covering that penetrate the plural openings forming plural elastic compensation elements (7) for holding differently sized drinking vessels (6), the elastic covering (10) being connected to the receptacle (2) at plural connection locations (18, 19, 20) wherein the plural connection locations (18, 19, 20) comprise at least one first connection location (19) disposed below the open top (4) and above the plural openings (8) and at least one second connection location (20) disposed below the plural openings (8).

2. The beverage holder (1) of claim 1, wherein the plural connection locations (18, 19, 20) further comprise at least one third connection location (20) disposed at the bottom wall (3).

3. The beverage holder (1) of claim 1, wherein the elastic covering (10) is connected to the side wall (5) of the receptacle (2) by staking.

4. The beverage holder (1) of claim 1, wherein the elastic covering (10) is connected to the side wall (5) of the receptacle (2) by a positive-locking connection.

5. The beverage holder (1) of claim 1, wherein the side wall (5) and the bottom wall (3) of the receptacle (2) are integral with one another.

6. The beverage holder (1) of claim 1, wherein the bottom wall (3) of the receptacle (2) is circular.

7. The beverage holder (1) of claim 1, wherein the bottom wall (3) of the receptacle (2) is polygonal.

8. The beverage holder (1) of claim 1, wherein the side wall (5) of the receptacle (2) has a tapered shape that defines larger cross-sections at greater distances from the bottom wall (3).

9. The beverage holder (1) of claim 1, wherein the elastic covering (10) is formed from a textile fabric.

10. The beverage holder (1) of claim 1, wherein each of the plural openings (8) is elliptical.

11. A method for manufacturing a beverage holder (1), comprising:
providing a receptacle (2) having a bottom wall (3), a side wall (5) extending from the bottom wall (3) and an open top (4) opposite the bottom wall (3), the side wall (5) tapering outward at farther distances from the bottom wall (3) and having plural openings formed through the side wall (5);
unrolling the elastic covering (10) from a tube and moving the elastic covering (10) over the side wall (5);
fixing the elastic covering (10) to the receptacle (2) at first regions (16) disposed on the side wall (5) between the openings (8) and the open top (4);
fixing the elastic covering (10) to the receptacle (2) in a second region (17) disposed on the side wall (5) below the openings (8) and/or in a third region (18) disposed on the bottom wall (3) of the receptacle (2), wherein portions of the elastic covering (10) that align with the openings penetrate into the openings due to inherent biasing of the elastic covering.

* * * * *